US012742119B2

United States Patent

(12) United States Patent
Jiang et al.

(10) Patent No.: US 12,742,119 B2
(45) Date of Patent: Sep. 22, 2026

(54) AQUEOUS FORMULATION OF OIL-SOLUBLE CORROSION INHIBITOR, AND PREPARATION METHOD AND REGENERATION METHOD THEREOF

(71) Applicant: PetroChina Company Limited, Beijing (CN)

(72) Inventors: Jingjing Jiang, Beijing City (CN); Yishan He, Beijing City (CN); Lihua Huang, Beijing City (CN); Jun Cao, Beijing City (CN); Jing Yan, Beijing City (CN); Wen Chen, Beijing City (CN); Yongfan Tang, Beijing City (CN)

(73) Assignee: PetroChina Company Limited, Beijing (CN)

( * ) Notice: Subject to any disclaimer, the term of this patent is extended or adjusted under 35 U.S.C. 154(b) by 601 days.

(21) Appl. No.: 18/255,664

(22) PCT Filed: Nov. 5, 2021

(86) PCT No.: PCT/CN2021/128913
§ 371 (c)(1),
(2) Date: Jun. 2, 2023

(87) PCT Pub. No.: WO2022/116773
PCT Pub. Date: Jun. 9, 2022

(65) Prior Publication Data

US 2024/0368468 A1 Nov. 7, 2024

(30) Foreign Application Priority Data

Dec. 3, 2020 (CN) ......................... 202011396388.3

(51) Int. Cl.
*C09K 15/30* (2006.01)
*C02F 5/10* (2023.01)
(Continued)

(52) U.S. Cl.
CPC ................ *C09K 15/30* (2013.01); *C02F 5/10* (2013.01); *C09K 8/54* (2013.01); *C23F 11/146* (2013.01);
(Continued)

(58) Field of Classification Search
None
See application file for complete search history.

(56) References Cited

U.S. PATENT DOCUMENTS

| | | |
|---|---|---|
| 5,243,047 A | 9/1993 | Lawson |
| 6,866,797 B1 | 3/2005 | Martin et al. |

(Continued)

FOREIGN PATENT DOCUMENTS

| | | |
|---|---|---|
| CN | 1435384 A | 8/2003 |
| CN | 1819000 A | 8/2006 |

(Continued)

OTHER PUBLICATIONS

Russian Patent Office Action and Search Report for Application No. 2023109622 dated Feb. 2, 2024 (9 pages including English translation).

(Continued)

*Primary Examiner* — Joseph D Anthony
(74) *Attorney, Agent, or Firm* — Michael Best & Friedrich LLP

(57) ABSTRACT

The present disclosure relates to an aqueous formulation of an oil-soluble corrosion inhibitor, and a preparation method and a regeneration method thereof. The preparation method comprises the following steps: (1) obtaining the temperature T at which the conductivity of the aqueous formulation of the oil-soluble corrosion inhibitor is decreased to no higher than 100 μs/cm; (2) gradually adding water dropwise to a corrosion inhibitor stock solution, which is obtained by mixing the oil-soluble corrosion inhibitor and a solvent oil (Continued)

homogeneously, to produce a reverse micelle liquid A, and then heating up the reverse micelle liquid A to the temperature T and maintaining at this temperature; (3) mixing a non-ionic surfactant, an anionic surfactant and water homogeneously to obtain a mixture solution B, and heating up the mixture solution B to the temperature T and maintaining at this temperature; and (4) mixing the reverse micelle liquid A and the mixture solution B homogeneously, and stirring it at the temperature T for no more than 2 minutes before immediately cooling it, to obtain the aqueous formulation of the oil-soluble corrosion inhibitor. The aqueous formulation of the oil-soluble corrosion inhibitor produced by the method is easy to produce, simple to use and extremely stable.

22 Claims, 4 Drawing Sheets

(51) Int. Cl.
*C09K 8/54* (2006.01)
*C23F 11/14* (2006.01)

(52) U.S. Cl.
CPC ........ *C23F 11/149* (2013.01); *C02F 2303/08* (2013.01)

(56) References Cited

U.S. PATENT DOCUMENTS 10,561,587 B2 * 2/2020 Koide ...................... A61K 8/06
2006/0166835 A1 7/2006 Yang et al.
2006/0176251 A1 8/2006 Park et al.
2011/0101280 A1 5/2011 Motoyama et al.
2011/0193027 A1 * 8/2011 Mackenzie ............. C23F 11/00 436/164
2017/0087064 A1 * 3/2017 Ikeda .................... A61Q 19/00
2017/0156998 A1 * 6/2017 Koide .................... A61K 8/068
2020/0040287 A1 2/2020 Papadopoulos et al.

FOREIGN PATENT DOCUMENTS

CN 1865171 A 11/2006
CN 101050537 A 10/2007
CN 101280222 A 10/2008
CN 102747374 A 10/2012
CN 102839376 A 12/2012
CN 102965149 A 3/2013
CN 103450865 A 12/2013
CN 103757640 A 4/2014
CN 105363360 A 3/2016
CN 105503855 A 4/2016
CN 106047328 A 10/2016
CN 106336900 A 1/2017
CN 106047328 B 11/2017
CN 108264891 A 7/2018
CN 108727268 A 11/2018
CN 108998799 A 12/2018
CN 110573591 A 12/2019
CN 111472007 A 7/2020
CN 113970505 A 1/2022
EP 0649867 A1 4/1995
JP H08323189 A 12/1996
RU 1433079 A1 12/1994
RU 2347011 C1 2/2009
RU 2397275 C2 8/2010
WO 2004/059037 A2 7/2004

OTHER PUBLICATIONS

China National Mechanical Industry Standard, "JBT79012001, Metals materials—Uniform corrosion—Methods of laboratory immersion testing," 1999, 17 pages.
Master's thesis, Huazhong University of Science and Technology, "Research on water-soluble rust inhibitor FY1 for iron castings during production processes," 2004.
First Search Report issued on Sep. 23, 2022 for counterpart Chinese patent application No. 202011396388.3 (5 pages, machine English translation included).
International Search Report issued for counterpart Chinese patent application No. PCT/CN2021/128913 mailed on Jan. 19, 2022 (2 pages).
Russian Patent Office Second Office Action for Application No. 2023109622, dated May 28, 2024 (9 pages including English translation).
Canadian Patent Office Action for Application No. 3,196,516, dated May 21, 2024, 4 pages.

* cited by examiner

AQUEOUS FORMULATION OF OIL-SOLUBLE CORROSION INHIBITOR, AND PREPARATION METHOD AND REGENERATION METHOD THEREOF

CROSS REFERENCE TO RELATED APPLICATIONS

The present application is a U.S. National Phase of International Application No. PCT/CN2021/128913, filed Nov. 5, 2021, which claims priority to Chinese Patent Application No. 202011396388.3 filed Dec. 3, 2020, the entire contents of both of which are herein incorporated by reference.

TECHNICAL FIELD

The present disclosure relates to the technical field of corrosion inhibitor, and in particular, to an aqueous formulation of an oil-soluble corrosion inhibitor, and a preparation method and a regeneration method thereof.

BACKGROUND OF ART

Corrosion inhibitors are widely used in various industries as one of the most essential methods of preventing metal corrosion. The conveying medium in the pipeline is typically a corrosive mixture of oil, water, gas, and the like, especially in the field of gathering and transportation in the oil and gas field. Organic corrosion inhibitors can be divided into two types based on their solubility: water-soluble corrosion inhibitors and oil-soluble corrosion inhibitors. As the name implies, water-soluble corrosion inhibitors are exceptionally soluble in water, whereas oil-soluble corrosion inhibitors are generally soluble in oil.

For example, CN 103450865A discloses an oil-soluble hydrogen sulfide corrosion inhibitor using kerosene as the solvent. CN 102747374A discloses an oil-soluble corrosion inhibitor using C6-C10 aromatics as the solvent, and a preparation method and use thereof. CN 102965149A discloses a method for preparing an oil-soluble corrosion inhibitor using benzene, toluene or xylene as the solvent. CN 106336900A discloses a high-efficiency oil-soluble high-temperature amide corrosion inhibitor using toluene as the solvent.

Water-soluble corrosion inhibitors are extensively used in the oil and gas industry for continuous injection and are typically intended to protect metal materials against corrosion in aqueous media during actual use. Meanwhile, because it is difficult to dissolve or disperse in the aqueous phase but has a relatively strong film-forming property, oil-soluble corrosion inhibitors are typically used only as a pre-film (batch) corrosion inhibitor in a process like coating a layer of paint first on a metal surface. In some cases, however, oil-soluble corrosion inhibitors are also used for continuous injection. During actual use, the continuous injection is to immediately supply the corrosion inhibitor to the pipeline, where it is dissolved/dispersed in the gas field water and performs its corrosion inhibiting effect. At this time, if the oil-soluble corrosion inhibitor is used for continuous injection, it is usually floating on the water surface or suspended in water in a state of large oil beads. Thus, it is difficult to quickly reach the uniform dispersion in the water, which is not conducive to rapid completion of the migration of corrosion inhibitor molecules from the aqueous phase and adsorption to the metal surface. A "window period" is caused due to the late adsorption of corrosion inhibitor on the metal surface, and the corrosion inhibiting effect of the corrosion inhibitor on the metal materials may be further affected.

In fact, as one of the commonly used corrosion inhibitors, the oil-soluble corrosion inhibitor, once adsorbed to the metal surface, often has a better corrosion protection effect than the water-soluble corrosion inhibitor, due to its good film forming property and long persistence of film. In other words, in view of the corrosion inhibitor function mechanism, the decisive factor to influence the effect of the oil-soluble corrosion inhibitor is usually the migration and adsorption of the corrosion inhibitor molecules. However, there is no approach of fast and direct dispersion of the oil-soluble corrosion inhibitor in water in the prior art.

On the other hand, from the perspective of environmental protection, the oil-soluble corrosion inhibitors may involve the risk of environmental hazards in the storage and transportation process. For example, during the actual use, chemical plastic drums are usually used to accommodate the corrosion inhibitors. When the corrosion inhibitor runs out, the plastic drums cannot be easily cleaned due to the adhesion of solvent oil, and become a dangerous waste to deal with, causing a pressure in safety, environmental protection and economics to the enterprises. However, if an aqueous formulation is used, the cleaning and recycling of the drums will become much easier.

In addition, from the viewpoint of easy use on site, the aqueous formulation can be prepared in advance into a concentrated liquid of a high concentration, and then diluted with typical water as selected according to the actual situation on site, which is convenient, because water is a convenient and readily available raw material. CN 106047328A discloses a nanoemulsion corrosion inhibitor containing imidazolyl ionic liquid and a preparation method thereof, using the principle of emulsion dispersion, but the method is not universal and does not have the special function of formulating the oil-soluble corrosion inhibitor into an aqueous formulation. Therefore, there is still an urgent need to formulate the oil-soluble corrosion inhibitor into an aqueous formulation.

SUMMARY OF THE INVENTION

In order to solve the above problems, it is an object of the present disclosure to provide a method for preparing an aqueous formulation of an oil-soluble corrosion inhibitor, by which the aqueous formulation of the oil-soluble corrosion inhibitor as prepared can quickly and directly disperse the oil-soluble corrosion inhibitor in water.

Another object of the present disclosure is to provide an aqueous formulation of an oil-soluble corrosion inhibitor prepared by the above method.

A further object of the present disclosure is to provide a method for regenerating the above-mentioned oil-soluble corrosion inhibitor aqueous formulation.

To achieve the above objects, in one aspect, the present disclosure provides a method for preparing an aqueous formulation of an oil-soluble corrosion inhibitor, comprising the steps of: (1) obtaining the temperature T at which the conductivity of the aqueous formulation of the oil-soluble corrosion inhibitor is decreased to no higher than 100 μs/cm; (2) gradually adding water dropwise to a corrosion inhibitor stock solution, which is obtained by mixing the oil-soluble corrosion inhibitor and a solvent oil homogeneously, to produce a reverse micelle liquid A, and then heating up the reverse micelle liquid A to a temperature equal to or higher than the temperature T and maintaining at the temperature;

(3) mixing a non-ionic surfactant, an anionic surfactant and water homogeneously to obtain a mixture solution B, and heating up the mixture solution B to a temperature equal to or higher than the temperature T and maintaining at the temperature; and (4) mixing the reverse micelle liquid A and the mixture solution B homogeneously, and stirring it at the temperature equal to or higher than the temperature T for no more than 2 minutes before immediately cooling it, to obtain the aqueous formulation of the oil-soluble corrosion inhibitor.

According to some specific embodiments of the present disclosure, in step (1), the temperature T is determined by a process comprising mixing homogeneously all raw materials for the formula components of the aqueous formulation of the oil-soluble corrosion inhibitor in advance to obtain a mixture C; gradually heating up the mixture C, and detecting the trend of conductivity of the mixture C with the temperature during the heating process, wherein as the temperature increases, the conductivity increases and then decreases and continues to decrease to no higher than 100 μs/cm; and recording the temperature at which the conductivity is decreased to no higher than 100 μs/cm as the temperature T.

According to some specific embodiments of the present disclosure, the raw materials for the aqueous formulation of the oil-soluble corrosion inhibitor include the following components by weight: 0.5-1.5 parts of the oil-soluble corrosion inhibitor, 2-10 parts of the solvent oil, 2-6 parts of the non-ionic surfactant, 0.01-0.2 part of the anionic surfactant, and 5-20 parts of water.

According to some specific embodiments of the present disclosure, stirring is carried out in each process of the steps (1)-(4) under a stirring condition of preferably 50-600 rpm, just to meet the requirement that the materials can be mixed uniformly. Higher stirring conditions can be used, but it is not recommended from the viewpoint of energy consumption. In slow stirring, the rotating speed is controlled at 50-200 rpm. The method for preparing an oil-soluble corrosion inhibitor into an aqueous formulation according to the present disclosure is simple, without high-intensity stirring, and can be achieved by temperature changes under a slow stirring condition.

The temperature T is a key temperature in the preparation process of the aqueous formulation of the oil-soluble corrosion inhibitor. During heating, the conductivity value of the above mixed solution C usually increases gradually with the increasing temperature at first, and when the temperature exceeds a certain value (usually between 30-80° C., which is different in different types of surfactants), the conductivity value will be quickly decreased to 100 μs/cm or less. The temperature at which the conductivity is decreased to 100 μs/cm is the best heating temperature T. Theoretically, the temperature T in steps (2)-(4) in the process for preparing the aqueous formulation of the oil-soluble corrosion inhibitor can be replaced by a temperature higher than T, but the temperature T can be used from the viewpoint of energy saving. When the formulation composition is consistent, the determination of temperature T only needs to be carried out once. The subsequent batch preparation still requires heating to the temperature T.

According to some specific embodiments of the present disclosure, in step (2), the oil-soluble corrosion inhibitor is 0.01-20% by weight, preferably 10% by weight, of the corrosion inhibitor stock solution. The homogeneous mixing of the oil-soluble corrosion inhibitor with the solvent oil includes stirring.

According to some specific embodiments of the present disclosure, the oil-soluble corrosion inhibitor is selected from corrosion inhibitors dissolvable and dispersible in a hydrocarbon-based or ester-based solvent, preferably CT2-19.

According to some specific embodiments of the present disclosure, the solvent oil is selected from a polar or non-polar oil material such as GTL, paraffin oil, diesel oil, peanut oil, rapeseed oil, isopropyl myristate, decane, octane or the like, preferably one selected from a hydrocarbon-based mineral oil and an ester-based vegetable oil.

In practice, the oil-soluble corrosion inhibitor needs to be dissolved in a solvent oil when used, so it has usually been mixed with solvent oil in the production and distribution, and thus it can directly go to the dropwise addition of water without preparing the corrosion inhibitor stock solution in advance. In step (2), the oil-soluble corrosion inhibitor can be selected according to the actual needs without specific limitations. This type of corrosion inhibitor can usually be easily dissolved and dispersed in an oil material, and in most cases, present in the form of a homogeneous and transparent phase. However, usually, this type of corrosion inhibitor is hardly dissolved and dispersed in the aqueous phase. When added to the aqueous phase, it usually floats or is suspended in the aqueous phase, while the excessive addition thereof will form oil beads on the water surface. The oil-soluble corrosion inhibitor preferably includes one dissolvable and dispersible in a hydrocarbon-based or an ester-based solvent, such as Corrosion Inhibitor CT2-19 from the Research Institute of Natural Gas Technology, PetroChina Southwest Oil and Gasfield Company. During the actual use, the solvent oil may be selected in terms of the dissolution and dispersion of oil-soluble corrosion inhibitors therein. After the oil-soluble corrosion inhibitor and the solvent oil are stirred well, it is preferable that a homogeneous and transparent solution is produced without precipitation and suspension when it is left stand.

According to some specific embodiments of the present disclosure, the reverse micelle liquid A is prepared by a process specifically including: gradually adding water to the corrosion inhibitor stock solution dropwise (in a rate of no greater than 1 ml/min) under a stirring condition of 50-200 rpm, and continuously stirring for 24 hours to obtain the reverse micelle liquid A. In the case of using some oil-soluble corrosion inhibitors, the water added dropwise into the oil-soluble corrosion inhibitor achieves no or little solubilization with an obvious water-oil separation. At this time, it is necessary to add a small amount of carbon alcohols having a carbon number of C4-C12, such as n-octanol, to achieve water solubilization, so as to promote the formation of reverse micelles, where the amount of carbon alcohol does not exceed the amount of water added herein.

The amount of water in the reverse micelle liquid in step (2) as above needs to be determined experimentally, so that the water added to the corrosion inhibitor stock solution is completely solubilized. Specifically, after a certain amount of water is solubilized in the corrosion inhibitor stock solution according to step (2), there may be residual water that is not effectively solubilized in the system, which needs to be removed. The above system can be centrifuged under a high-speed centrifuge for 10 minutes to produce the reverse micelle liquid A. Instead of centrifugation, the system can be left to stand for a long time (24 hours) to remove the residual water that has not been effectively solubilized. In the later preparation process, the amount of water that is effectively solubilized is directly used as the amount of water added in step (2), i.e., not only the amount of water added dropwise into the corrosion inhibitor stock solution, but also the amount of water that is not effectively solubilized as removed by centrifugation or long time standing are recorded in the experiment, to assist in determining the amount of water in step (2).

According to some specific embodiments of the present disclosure, the water added dropwise is in an amount of 0.01-2% by mass of the reverse micelle liquid A.

According to some specific embodiments of the present disclosure, the ratio of the total mass of the nonionic surfactant and the anionic surfactant to the mass of the reverse micelle liquid A is 1:(5-1) in step (3).

According to some specific embodiments of the present disclosure, the mass ratio of the nonionic surfactant to the anionic surfactant is (1000-10):1 in step (3).

According to some specific embodiments of the present disclosure, the nonionic surfactant is one or both selected from a temperature-sensitive surfactant having a polyoxyethylene structure in the molecular structure and a temperature-sensitive surfactant having a polyol ester structure in the molecular structure. For example, it may be one or more selected from the alkylphenol polyoxyethylene ether series (such as nonylphenol polyoxyethylene (9.7) ether), CE series (such as C12E4, C12E10), Span (such as Span80) and Tween (such as Tween80) in use. It is required that the oil and aqueous phases can be mixed to achieve a sudden and sharp decrease in the conductivity of the mixture system at a certain temperature. Usually two surfactants with different lipophilic and hydrophilic balance values are required to be combined to achieve the optimal effect.

The temperature-sensitive nonionic surfactants is selected based on the law that the degree of hydration of their hydrophilic groups varies by temperature, and usually the higher the temperature, the lower the degree of hydration and the lower the hydrophilicity as exhibited. In view of the whole ternary system of nonionic surfactant-water-oil (the oil herein is actually a reverse micelle liquid), temperature changes will cause changes in the phase state of the system. When the three phases are used in a proper ratio, the system will become a bicontinuous microemulsion phase or liquid crystal phase when the whole system is heated to a certain temperature range. At this time, a balance may be formed between the hydrophilic and lipophilic properties of the nonionic surfactants, and the system will form an extremely stable oil-in-water nanoemulsion system by keeping stirring under this condition and then suddenly cooling it down, while the oil-soluble corrosion inhibitor will be stably encapsulated in the core of the oil phase due to the formation of the reverse micelle liquid in advance.

According to some specific embodiments of the present disclosure, in step (3), the anionic surfactant is selected from monovalent fatty acid salts having a carbon chain length of C8-18. It functions to add the pH response to the whole system. Because the corrosion inhibitor is generally used in an acidic gas field water, that is, the lower the pH value the stronger the acid, and sodium oleate will be transformed into oleic acid just at low pH, the stability of the whole aqueous formulation system is destroyed to accelerate the rapid release of the corrosion inhibitor as an active ingredient in the whole aqueous formulation system, when the corrosion inhibitor system is exposed to an acidic medium and the highly water-soluble sodium oleate is transformed into a less water-insoluble oleic acid. That is to say, the more acidic corrosive medium exposed to the final aqueous formulation system, the faster the release of its active ingredients.

According to some specific embodiments of the present disclosure, the fatty acid salt is selected from sodium oleate.

According to some specific embodiments of the present disclosure, the nonionic surfactant is a mixture of sorbitan fatty acid esters and sorbitan monooleate polyoxyethylene ether in a weight ratio of 37:63, and the anionic surfactant is selected from sodium cocoate.

According to some specific embodiments of the present disclosure, the mass percentage of water contained in the final oil-soluble corrosion inhibitor aqueous formulation is 30%-90%, preferably 40%-80%, further preferably 50%-70%.

According to some specific embodiments of the present disclosure, in step (4), the cooling rate is ≥10° C./min. In the step, any method that enables the system to cool down quickly can be used, including but not limited to an ice water bath for the system. The resulting mixture system can also be poured into low-temperature water of which the temperature is pre-controlled (the lower the temperature thereof, the better). The amount of water herein can be adjusted as needed, since the amount of water will not affect the final aqueous formulation system except for the concentration and cooling rate. The rapid cooling may be achieved under stirring.

The present disclosure also provides an aqueous formulation of an oil-soluble corrosion inhibitor obtained by the above preparation method.

The aqueous formulation of the oil-soluble corrosion inhibitor prepared by the above preparation method is an aqueous formulation system having a structure of a reverse micelle/oil/water multiple emulsion, which can be understood to be composed of a thermodynamically stable core and a kinetically stable shell.

The oil-soluble corrosion inhibitor aqueous system produced by the above preparation method has a structure of (reverse micelle/oil/water) multiple emulsion, which is a special dual structure. The (micelle/oil) reverse-phase part of the system is a thermodynamically stable system, which is formed spontaneously and does not destabilize with time, contributing to the stable existence of the corrosion inhibitor in the oil phase. The (oil/water) emulsion part of the system is a thermodynamically unstable system, which will inevitably destabilize with time in theory. However, the (oil/water) emulsion produced by the method of heating up and then cooling down suddenly in the present disclosure is a nanoemulsion system with a droplet size of 300 nm or less, so the oil-soluble corrosion inhibitor is already highly dispersed in the droplet core and can form a film well on the metal surface in the aqueous body. It has extremely remarkable kinetic stability characteristics, and the droplet size is extremely small, and usually it will not be destabilized when left stand for half a year or longer, i.e., no phenomena such as separation and floating occur.

The aqueous formulation of the oil-soluble corrosion inhibitor produced by the above preparation method may have a color intimately related with the color of the corrosion inhibitor itself, which is generally transparent or translucent, but generally becomes bluish after dilution with water. When used, the aqueous formulation of the oil-soluble corrosion inhibitor may be added directly to an aqueous media in need, and can be quickly dispersed in the water. The aqueous formulation of the oil-soluble corrosion inhibitor can also be diluted with any proportion of water in advance according to the practice before use.

The present disclosure also provides a method for regenerating the above-mentioned oil-soluble corrosion inhibitor aqueous formulation, comprising the steps of: when the aqueous formulation of the oil-soluble corrosion inhibitor appears to be destabilized, heating up the aqueous formulation of the oil-soluble corrosion inhibitor to the temperature T and maintaining for 1-10 minutes, and then suddenly cooling the aqueous formulation of the oil-soluble corrosion inhibitor to obtain a regenerated aqueous formulation of the oil-soluble corrosion inhibitor.

According to some specific embodiments of the present disclosure, the cooling rate is ≥10° C./min.

Beneficial Effects of the Present Disclosure (1) The aqueous formulation of the oil-soluble corrosion inhibitor produced by the preparation method of the present disclosure is usually translucent to transparent, and becomes bluish to milky white after dilution with water. The aqueous formulation can be directly added to the aqueous medium in use, and can be rapidly dispersed in water. The aqueous formulation can also be diluted with any proportion of water in advance according to the practice before use.

(2) The aqueous formulation produced by the preparation method of the present disclosure has a structure of a reverse micelle/oil/water nanoemulsion, with a droplet size of less than 300 nm. The oil-soluble corrosion inhibitor is already highly dispersed in the droplet core and can form a film well on the metal surface in the aqueous formulation. In addition, because the droplet size is extremely small, it will not delaminate or float even if it is left stand at room temperature for several months.

(3) The method for preparing the aqueous formulation of the oil-soluble corrosion inhibitor of the present disclosure is relatively simple, without high-intensity stirring, and can be done by temperature change under slow stirring conditions.

(4) In use, even if the aqueous formulation appears to be destabilized, such as separation or floating, it can be restored to the aqueous formulation with stable performance by the regeneration method of the present disclosure, so it is extremely convenient to use and store.

BRIEF DESCRIPTION FOR DRAWINGS

DETAILED DESCRIPTION FOR PREFERRED EMBODIMENTS

The technical solutions in the present disclosure will be clearly and completely described below in conjunction with the embodiments of the present disclosure in order to enable those in the art to better understand the present disclosure. Obviously, the embodiments described are only a part of the present disclosure, and not all of them. Based on the embodiments in the present disclosure, all other embodiments obtained by a person of ordinary skill in the art without making creative labor shall fall within the protection scope of the present disclosure.

It should be noted that the terms "include(s), including, comprise(s), comprising" and "have, has, having" and any variations thereof in the specification and claims of the present disclosure are intended to cover non-exclusive inclusion. For example, a process or method that includes a series of steps need not be limited to those steps clearly listed, but may include other steps not clearly listed or inherent to those processes or methods. For those of ordinary skill in the art, the specific meaning of the above terms in the context of the present disclosure may be understood in the context.

It is to be noted that the embodiments and the features in the embodiments of the present disclosure may be combined with each other without conflict.

Example 1

This example provides a method for preparing an aqueous formulation of an oil-soluble corrosion inhibitor comprising the following steps.

An aqueous formulation prepared from an oil-soluble corrosion inhibitor, a sulfur-containing imidazoline derivative (i.e., an aqueous formulation of an oil-soluble corrosion inhibitor), comprises the following raw materials by weight: 1 part of the oil-soluble corrosion inhibitor, 4 parts of 0 #diesel oil, 2.5 parts of a non-ionic surfactant, 0.025 part of an anionic surfactant, and 17.5 parts of water. Among these, the oil-soluble corrosion inhibitor is Corrosion Inhibitor CT2-19 developed by the Research Institute of Natural Gas Technology, PetroChina Southwest Oil and Gasfield Company, the nonionic surfactant is a mixture of sorbitan fatty acid ester and sorbitan monooleate polyoxyethylene ether in a weight ratio of 37:63, and the anionic surfactant is selected from sodium oleate.

Figure 1:
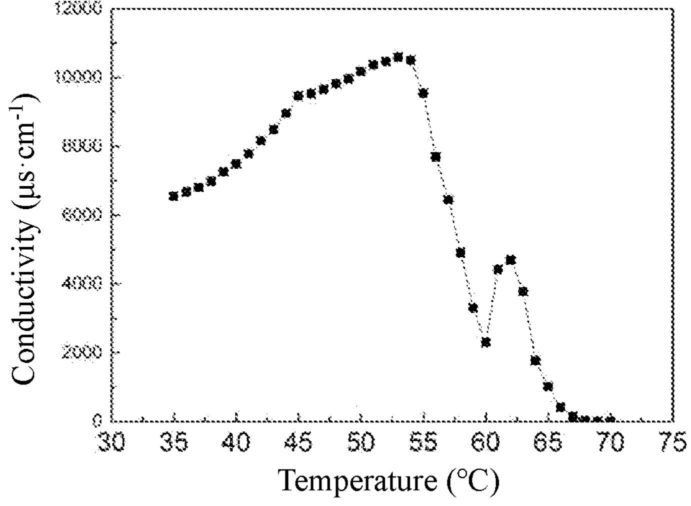
FIG. 1 is a graph illustrating the function of conductivity with temperature during the preparation of the aqueous formulation of the oil-soluble corrosion inhibitor in Example 1 of the present disclosure.

Firstly, all of the raw materials were mixed homogeneously according to the above formula to give a mixture solution C. The above mixed solution was gradually heated up with slow stirring, and the trend of conductivity value of the mixture solution with temperature was monitored by a conductivity meter during the heating process to obtain a conductivity trend graph as shown in FIG. 1. When the temperature was increased to 55° C., the conductivity was dropped rapidly, and the conductivity was in turn increased at 60° C., and was again dropped at 62° C. The conductivity was decreased to 100 μs/cm or lower when the temperature was increased to 67° C. Thus, 67° C. was used as the temperature T.

20 g of Corrosion Inhibitor CT2-19 (developed by Research Institute of Natural Gas Technology, PetroChina Southwest Oil and Gasfield Company consisting of a main component and a solvent oil which are mixed homogeneously under stirring, wherein the main component is sulfur-containing imidazoline derivative at a concentration of 10 wt %, prepared by a process as in Example 1 of the patent application publication No. CN101050537A, and the solvent oil is 0 #diesel oil) was used. Under stirring with a speed of 200 rpm, 0.2 g of water was gradually added dropwise to the corrosion inhibitor stock solution composed of the sulfur-containing imidazoline derivative and 0 #diesel oil, and stirred for 24 hours to obtain the reverse micelle liquid A. Then the reverse micelle liquid A was heated up to and maintained at 67° C.

10 g of a nonionic surfactant, 0.1 g of an anionic surfactant and 69.8 g of water were mixed homogeneously to obtain a mixture solution B, which was then heated up to and maintained at 67° C., wherein the nonionic surfactant is a mixture of sorbitan fatty acid ester and sorbitan monooleate polyoxyethylene ether in a weight ratio of 37:63, and the anionic surfactant is selected from sodium oleate.

The reverse micelle liquid A and the mixture solution B were stirred well and maintained at 67° C. for 30 seconds and then the whole system was transferred to an ice water bath, and cooled down suddenly under stirring to produce the oil-soluble corrosion inhibitor CT2-19 aqueous formulation.

The corrosion inhibitor aqueous formulation produced in Example 1 was bluish. When it was dropped into water, it was observed to be rapidly dispersed homogeneously in water, making it adaptable to a variety of filling methods. When the corrosion inhibitor CT2-19, as received, was dropped into water, it floated as oil beads on the water surface, and dispersed slowly, which would lead to an oil floating state if it was filled under impact.

Generally, the solubility is positively correlated with temperature, that is, the lower the temperature the lower the solubility, which may cause some oil-soluble corrosion inhibitors to have destabilization phenomena such as separation or precipitation in low temperature storage environment in winter. However, the aqueous formulation produced by the method provided in this example of the present disclosure has an extremely high stability, which is negatively correlated with temperature, i.e., the lower the temperature the higher the stability will be, and the destabilization phenomena such as separation or precipitation will hardly occur.

The pH value of the aqueous formulation produced in this example was adjusted to 2, 3, 4, 5, 6, 7 through a pH adjuster. The destabilization time was determined through long time standing test, the results of which are shown in Table 1. It can be seen from Table 1 that the stability of the aqueous formulation produced in this example is very high under neutral conditions, while the stability of the aqueous system was destroyed under acidic adjustment. This is mainly because when the aqueous formulation was exposed to an acidic medium, the highly water-soluble sodium oleate therein was transformed into a less water-soluble oleic acid, which destroyed the stability of the whole aqueous formulation system, so that the rapid release of the active ingredients of the corrosion inhibitor in the whole aqueous formulation system can be accelerated.

TABLE 1

The pH responsivity of the aqueous formulation

| pH | Destabilization time |
|---|---|
| 2 | 1.3 h |
| 3 | 3.7 h |
| 4 | 10.3 h |
| 5 | 38 h |
| 6 | 10 days |
| 7 | No separation in 6 months |

The aqueous formulation produced in this example was frozen at −10° C. for 2 hours, and no destabilization phenomena such as separation was found after natural thawing, and thus it has excellent freeze-thaw stability. In addition, the aqueous formulation produced in this example showed no separation of the emulsion, after it was centrifuged at a speed of 3000 rpm for 30 minutes, and thus it has excellent mechanical stability.

The continuous phase of the oil-soluble corrosion inhibitor is a solvent oil with a low flash point, resulting in the corrosion inhibitor product generally having a flash point close to that of the solvent oil. For example, the flash point of GB 5 #diesel is 55° C., and the flash point of the corrosion inhibitor CT2-19 using the diesel as a solvent oil is 60° C., close to the temperature of the surface gathering system in oil and gas fields. However, the continuous phase of the aqueous formulation produced by the preparation method of the present disclosure is water with a high flash point higher than 90° C. as tested, far exceeding the temperature of the ground gathering system, so that the aqueous formulation has more obvious advantages in field application.

Figure 2:
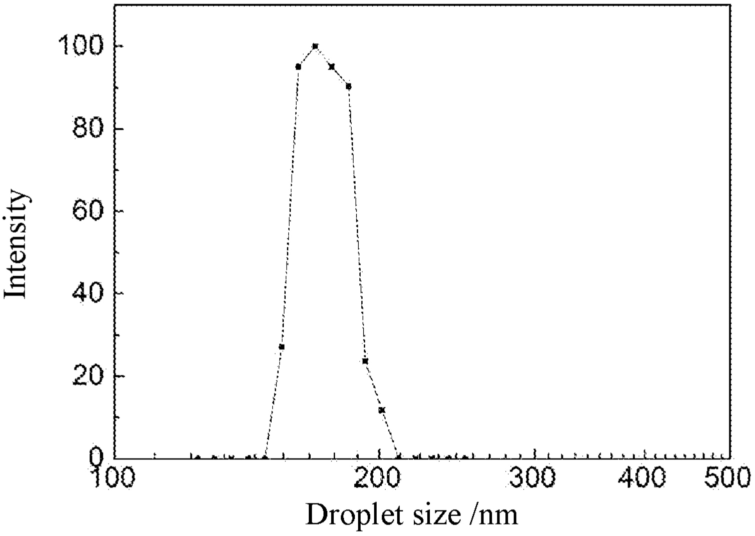
FIG. 2 is the droplet size distribution graph of the aqueous formulation of the oil-soluble corrosion inhibitor produced in Example 1 of the present disclosure.

The average droplet size of the aqueous formulation of the sulfur-containing imidazoline derivative produced in this example of the present disclosure was determined by Malvern laser particle size meter. The droplet size distribution is shown in FIG. 2, which shows that the droplet size in the aqueous formulation is less than 300 nm, with a majority thereof between 140-210 nm.

Example 2

This example provides a method for preparing an aqueous formulation of an oil-soluble corrosion inhibitor comprising the following steps.

An aqueous formulation prepared from an oil-soluble corrosion inhibitor, quinoline, (i.e., an aqueous formulation of an oil-soluble corrosion inhibitor), comprises the following raw materials by weight: 1 part of the oil-soluble corrosion inhibitor (quinoline), 4 parts of paraffin oil, 2.5 parts of a non-ionic surfactant, 0.025 part of an anionic surfactant, and 7.5 parts of water. Among these, the nonionic surfactant is cocoyl polyoxyethylene (4) ether, and the anionic surfactant is sodium palmitate.

Firstly, all of the raw materials were mixed homogeneously according to the above formula to give a mixture solution C. The above mixture solution was gradually heated up with a stirring speed of 100 rpm, and the trend of conductivity value of the mixture solution with temperature was monitored by a conductivity meter during the heating process. When the temperature was increased to 40° C., the conductivity was dropped rapidly, and the conductivity was decreased to 100 μs/cm or lower when the temperature was increased to 50° C. Thus, 50° C. was used as the temperature T.

4 g of quinoline and 16 g of paraffin oil were mixed well under stirring to obtain a corrosion inhibitor stock solution, and 0.2 of water was gradually added dropwise to the corrosion inhibitor stock solution under a low-speed stirring and stirred for 24 hours to produce a reverse micelle liquid A. Then the reverse micelle liquid was heated up to and maintained at 50° C.

10 g of a nonionic surfactant, 0.1 g of an anionic surfactant and 29.8 g of water were mixed homogeneously to obtain a mixture solution B, which was then heated up to and maintained at 50° C., wherein the nonionic surfactant is cocoyl polyoxyethylene (4) ether, and the anionic surfactant is selected from sodium palmitate.

The reverse micelle liquid A and the mixture solution B were mixed homogeneously and maintained at 50° C. for 10 seconds, thereafter the system was cooled down suddenly under stirring with a cooling rate controlled at 12° C./min, to produce an oil-soluble corrosion inhibitor (quinoline) aqueous formulation. The color of the corrosion inhibitor aqueous formulation produced in this example became bluish.

The aqueous formulation produced in this example was frozen at −10° C. for 2 hours, and no destabilization phenomena such as separation was found after natural thawing, and thus it has excellent freeze-thaw stability. In addition, the aqueous formulation produced in this example showed no separation of the emulsion, after it was centrifuged at a speed of 3000 rpm for 30 minutes, and thus it has excellent mechanical stability.

Example 3

This example provides a method for preparing an aqueous formulation of an oil-soluble corrosion inhibitor comprising the following steps.

An aqueous formulation prepared from an oil-soluble corrosion inhibitor, rosin imidazoline quaternary ammonium salt (i.e., an aqueous formulation of an oil-soluble corrosion inhibitor), comprises the following raw materials by weight: 1 part of the oil-soluble corrosion inhibitor (rosin imidazoline quaternary ammonium salt), 9 parts of 5 #diesel oil, 5 parts of a non-ionic surfactant, 0.1 part of an anionic surfactant, and 20 parts of water. Among these, the nonionic surfactant is a mixture of sorbitan fatty acid ester and sorbitan monooleate polyoxyethylene ether in a weight ratio of 37:63, and the anionic surfactant is selected from sodium oleate.

Firstly, all of the raw materials were mixed homogeneously according to the above formula to give a mixture solution C. The above mixture solution was gradually heated up at a stirring speed of 50 rpm, and the trend of conductivity value of the mixture solution with temperature was monitored by a conductivity meter during the heating process. When the temperature was increased to 70° C., the conductivity was dropped rapidly, and the conductivity was decreased to 100 μs/cm or lower when the temperature was increased to 80° C. Thus, 80° C. was used as the temperature T.

1 g of rosin imidazoline quaternary ammonium salt (developed by Research Institute of Natural Gas Technology, PetroChina Southwest Oil and Gasfield Company, prepared by a process as in Example 1 of the patent application publication No. CN108727268A) and 19 g of 5 #diesel oil were mixed homogeneously to produce a corrosion inhibitor stock solution. Under a low stirring speed, 0.2 g of water was gradually added dropwise to the corrosion inhibitor stock solution, and stirred for 24 hours to obtain the reverse micelle liquid A. Then the reverse micelle liquid A was heated up to and maintained at 80° C.

10 g of a nonionic surfactant, 0.5 g of an anionic surfactant and 29.8 g of water were mixed homogeneously to obtain a mixture solution B, which was then heated up to and maintained at 80° C., wherein the nonionic surfactant is a mixture of sorbitan fatty acid ester and sorbitan monooleate polyoxyethylene ether in a weight ratio of 37:63, and the anionic surfactant is selected from sodium cocoate.

The reverse micelle liquid A and the mixture solution B were mixed homogeneously and maintained at 80° C. for 1 minute and then the whole system was transferred to an ice water bath, and cooled down suddenly under stirring to produce the oil-soluble corrosion inhibitor (rosin imidazoline quaternary ammonium salt) aqueous formulation. The color of the corrosion inhibitor aqueous formulation became bluish.

The aqueous formulation produced in this example was frozen at −10° C. for 2 hours, and no destabilization phenomena such as separation was found after natural thawing, and thus it has excellent freeze-thaw stability. In addition, the aqueous formulation produced in this example showed no separation of the emulsion, after it was centrifuged at a speed of 3000 rpm for 30 minutes, and thus it has excellent mechanical stability.

Example 4

This example provides a method for preparing an aqueous formulation of an oil-soluble corrosion inhibitor comprising the following steps.

The corrosion rate of the corrosion inhibitor aqueous formulation produced in Example 1 was evaluated by the weight loss method.

Test conditions: 80° C., 5.0 wt % NaCl aqueous solution (deaerated), $H_2S$: 1000 ppm, $CO_2$: 240 ppm, oxygen-free environment.

Test period: 72 hours.

Metal material: TP110S, which is a common material used in oil and gas field wells.

Dosing instructions: the dosing concentration of the raw CT2-19 oil-soluble corrosion inhibitor is calculated based on the product (sulfur-containing imidazoline derivatives, and solvent oil), and the dosing concentration of the prepared aqueous formulation is also calculated based on the product (sulfur-containing imidazoline derivatives, solvent oil, water, and surfactant). Therefore, the effective concentration of the aqueous formulation is equivalent to 20% of the raw CT2-19 under the same dosage.

The experimental method was carried out by referring to the standard JB/T7901-2001, Metal materials-Uniform corrosion-Methods of laboratory immersion testing. The corrosion rate was calculated by calculating the weight loss before and after the test, and then the corrosion inhibition efficiency was calculated by comparing it with that under blank conditions. The data are shown in Table 2.

It can be seen from the data in Table 2 that the aqueous formulation of the oil-soluble corrosion inhibitor provided by Example 1 of the present disclosure has a corrosion inhibition efficiency comparable to that of the raw oil-soluble corrosion inhibitor, and kept at an excellent level.

TABLE 2

| the data for the corrosion evaluation | | | | | | |
|---|---|---|---|---|---|---|
| Material | No. | Dosage | Average weight loss (g) | Corrosion rate (mm/a) | Corrosion inhibition efficiency (%) | Remarks |
| TP110S | 1 | blank | 0.1153 | 1.52196 | — | |
| | 2 | CT2-19 1000 mg/L | 0.0055 | 0.0726 | 95.2 | |
| | 3 | Aqueous formulation 1000 mg/L | 0.0053 | 0.06996 | 95.4 | Equivalent to 20% of the dosage of trial No. 2 |
| | 4 | Aqueous formulation 2000 mg/L | 0.00605 | 0.07986 | 94.8 | Equivalent to 40% of the dosage of trial No. 2 |
| | 5 | Aqueous formulation 5000 mg/L | 0.00515 | 0.06798 | 95.5 | Equivalent to 100% of the dosage of trial No. 2 |

Example 5

This example provides an evaluation by a coupled multi-electrode test as follows.

The coupled multi-electrode test was carried out on the corrosion inhibitor aqueous formulation produced in Example 1. The test conditions are the same as those in Example 4, and the potential distributions under a blank condition and a condition of 50 mg/L aqueous formulation were measured respectively.

Figure 3A:
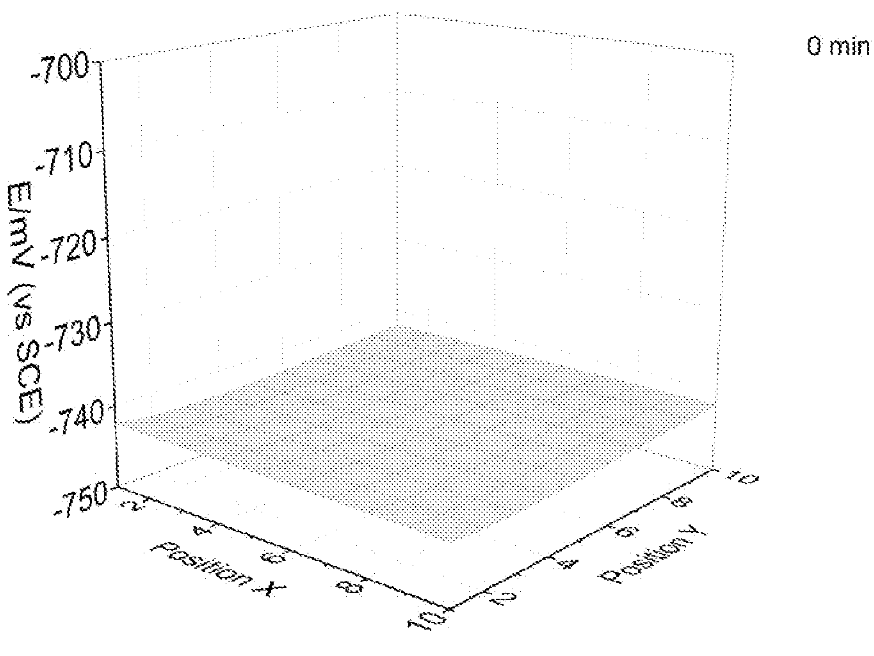
FIG. 3A illustrates the surface potential distribution on the L360 wire beam electrode at 0 min under blank conditions in a coupled multi-electrode test of Example 5 of the present disclosure.
Figure 3B:
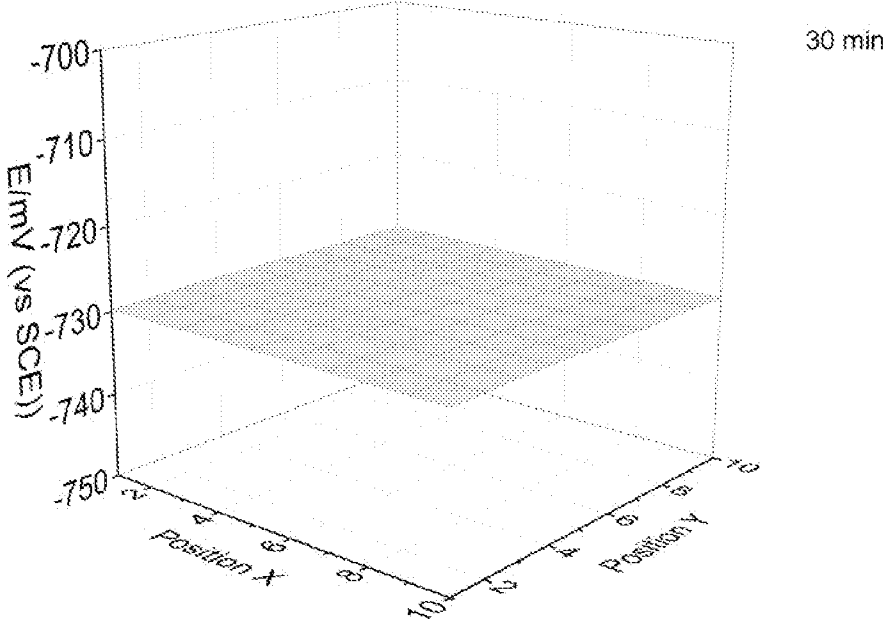
FIG. 3B illustrates the surface potential distribution on the L360 wire beam electrode at 30 min under blank conditions in a coupled multi-electrode test of Example 5 of the present disclosure.

FIG. 3A and FIG. 3B illustrate the surface potential distributions of the L360 wire beam electrode when equilibrated for 0 min and 30 min under blank conditions, in which FIG. 3A shows the surface potential distribution of the L360 wire beam electrode when equilibrated for 0 min and FIG. 3B shows the surface potential distribution of the L360 wire beam electrode when equilibrated for 30 min. It can be seen from FIG. 3A and FIG. 3B that the overall surface potential of the electrode slightly increased with time, which indicates that a corrosion products layer was formed on the metal surface.

Figure 4A:
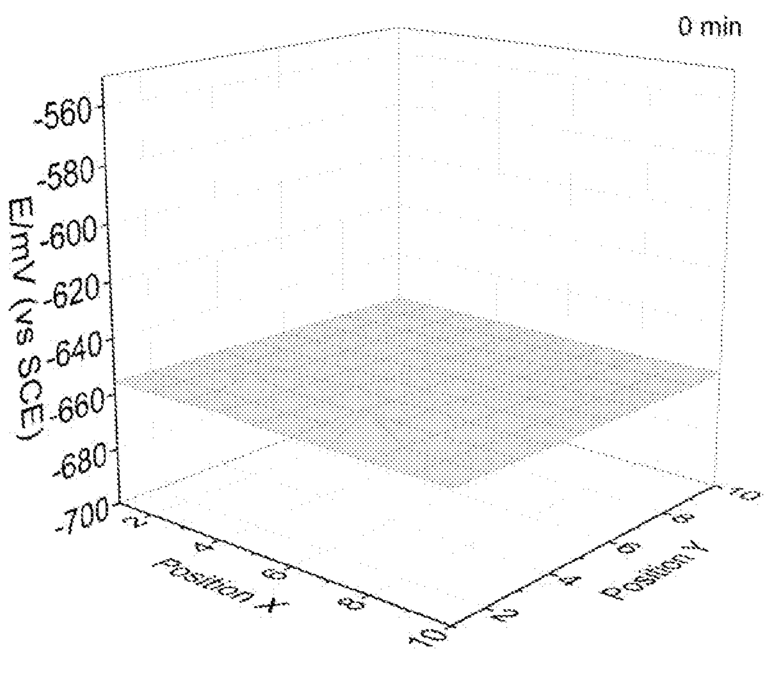
FIG. 4A illustrates the surface potential distribution on the L360 wire beam electrode at 0 min in presence of a corrosion inhibitor at a concentration of 50 ppm in a coupled multi-electrode test of Example 5 of the present disclosure.
Figure 4B:
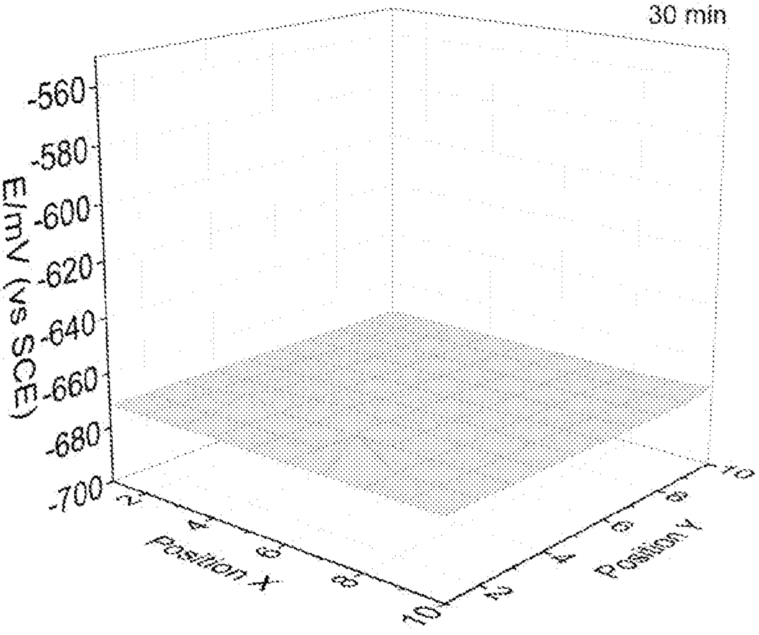
FIG. 4B illustrates the surface potential distribution on the L360 wire beam electrode at 30 min in presence of a corrosion inhibitor at a concentration of 50 ppm in a coupled multi-electrode test of Example 5 of the present disclosure.

FIG. 4A and FIG. 4B illustrate the surface potential distribution of the electrode when the dosage of the corrosion inhibitor aqueous formulation is a 50 mg/L. FIG. 4A shows the surface potential distribution of L360 wire beam electrode when equilibrated for 0 min, and FIG. 4B shows the surface potential distribution of L360 wire beam electrode when equilibrated for 30 min. It can be found that the potential distribution is still uniform after the addition of corrosion inhibitor aqueous formulation. In addition, the comparison of both at the same time shows that the metal surface potential slightly increased after the injection of corrosion inhibitor, which indicates that the thermodynamic corrosion tendency of the metal is reduced by the adsorption of corrosion inhibitor, and the absence of a minimal value in the metal surface potential indicates that the corrosion inhibitor is uniformly adsorbed on the metal surface.

Figure 5A:
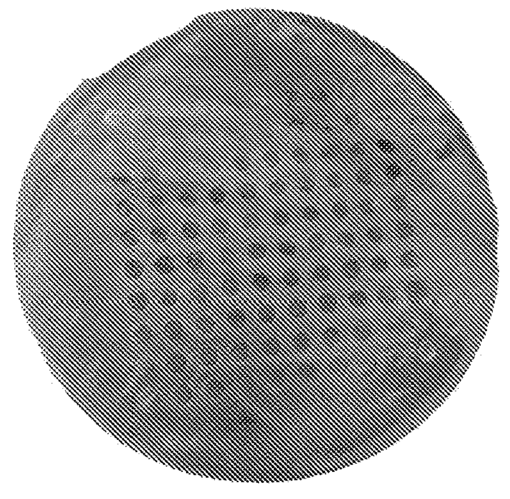
FIG. 5A is the picture showing a blank control after the wire beam electrode is immersed under blank conditions for 30 min in the coupled multi-electrode test of Example 5 of the present disclosure.
Figure 5B:
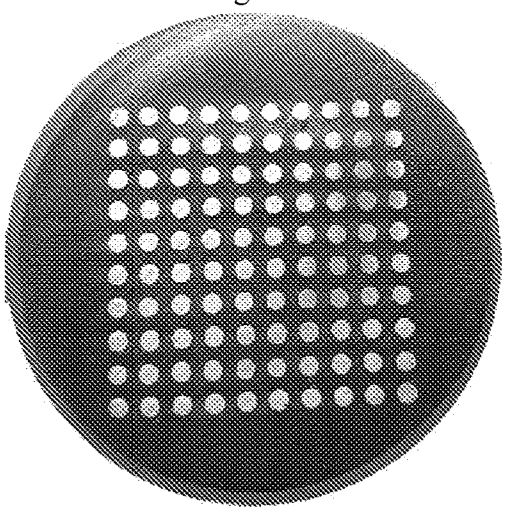
FIG. 5B illustrates the appearance of the wire beam electrode after immersed in 50 ppm corrosion inhibitor for 30 min in the coupled multi-electrode test of Example 5 of the present disclosure.

FIG. 5A and FIG. 5B illustrate the appearances of the wire beam electrodes after testing, wherein FIG. 5A shows the wire beam electrode under blank condition, while FIG. 5B shows the wire beam electrode under a condition of 50 mg/L aqueous formulation. It can be obviously seen that when the corrosion inhibitor was not added, the electrode surface was covered by a layer of black corrosion product film after testing, but the metal presented a uniform and bright morphology when immersed in the corrosion solution for 30 minutes, after the corrosion inhibitor was added. This indicates that the new corrosion inhibitor can form a layer of adsorption film well on the metal surface, so that the electrochemical process of corrosion is inhibited to a greater extent.

Example 6

This example is provided to examine the ease to clean the packaging drum accommodating the corrosion inhibitor aqueous formulation.

First, a test piece of the material of a packaging drum for a chemical product was obtained as the test object. In this example, polyethylene (PE) was selected with a size of 30 mm×15 mm×3 mm. Then the test piece was placed in a clean glassware, and weighed to obtain the total mass of the test piece and the clean glassware as m1.

The test piece was submerged in an oil-soluble corrosion inhibitor and its aqueous formulation, and the amount of adhesion is good if the corrosion inhibitor did not fall off when suspended for 60 s. Then it was placed in the glassware and weighed as m2. Further, water was added into the glassware for immersion for 10 min at room temperature, thereafter the glassware was placed on a gyratory shaker and shaken for 5 min.

The test piece was removed, and the glassware and test piece together were suspended at room temperature for draining for 60 min (to volatilize the moisture as much as possible). Then the test piece was again placed in the glassware, and weighed together as m3. The cleaning efficiency $\eta$ is calculated according to the following equation.

$$\eta = \left(1 - \frac{m_3 - m_1}{m_2 - m_1}\right) \times 100\%$$

wherein the greater the value of cleaning efficiency $\eta$, the easier it is to clean.

The raw CT2-19 (sulfur-containing imidazoline derivative+solvent oil) used in Example 1, the CT2-19 aqueous formulation produced in Example 1, the rosin imidazoline quaternary ammonium salt used in Example 3 and the rosin imidazoline quaternary ammonium salt aqueous formulation produced in Example 3 were tested for the cleaning efficiency, respectively, and the test results are shown in Table 3.

It can be seen from Table 3 that the cleaning efficiency of the aqueous formulation product produced in the Examples of the present disclosure is significantly higher than that of the corresponding oil-soluble corrosion inhibitor, when comparing the cleaning efficiencies of the packaging drum test pieces with CT2-19 and the CT2-19 aqueous formulation, and comparing the cleaning efficiencies of the packaging drum test pieces with rosin imidazoline quaternary ammonium salt and the rosin imidazoline quaternary ammonium salt aqueous formulation.

TABLE 3

| The experimental results for the cleaning efficiency | |
|---|---|
| Samples for comparative experiments | Cleaning efficiency, % |
| CT2-19 | 63.2 |
| CT2-19 aqueous formulation | 98.7 |
| rosin imidazoline quaternary ammonium salt | 59.4 |
| rosin imidazoline quaternary ammonium salt aqueous formulation | 97.6 |

Example 7

In order to test the dispersion performance of corrosion inhibitors, the dispersion rates of different types of corrosion inhibitors were tested by means of a test apparatus (as described in the patent application No. 202010708891.1, the entire content of which is incorporated by reference) indoors. The test apparatus consists of a simulated section of pipe with an upstream corrosion inhibitor filling port and a downstream corrosion inhibitor concentration monitor.

The test procedure is as follows. The pipeline was filled with a certain amount of simulated solution (corrosive medium), and a certain amount of corrosion inhibitor is weighed in advance (the specific amount is usually calculated according to the final concentration added to the simulated solution; in this example, the corrosion inhibitor should be weighed as 2 g, as calculated based on that the pipeline is filled with a solution of 10 L, and the effective concentration of corrosion inhibitor is 200 mg/L). Thus, 2 g of corrosion inhibitor was added at once at the upstream filling port, and the initial time was recorded. At the same time, the downstream concentration monitor started to record and analyze the concentration of corrosion inhibitor (plotting a curve of the concentration with time). When the concentration monitor recorded a concentration of corrosion inhibitor of 200 mg/L, the equilibration time was recorded.

The difference between the equilibration time and the initial time is taken as the dispersion time of the corrosion inhibitor, recorded as t. Obviously, the amplitude of t value indirectly reflects the dispersion rate of the corrosion inhibitor in a solution medium.

Test results are shown in Table 4. It can be seen from Table 4 that the dispersion rates of the aqueous formulations are significantly higher than that of the raw materials, with respect to the three corrosion inhibitors.

TABLE 4

| Experimental Results for dispersion rates of the corrosion inhibitors | | |
|---|---|---|
| Samples | Raw oil-soluble corrosion inhibitors, t/s | Aqueous formulation, t/s |
| quinoline | 324 | 56 |
| CT2-19 | 275 | 63 |
| rosin imidazoline quaternary ammonium salt | 378 | 72 |

Example 8

Figure 6:
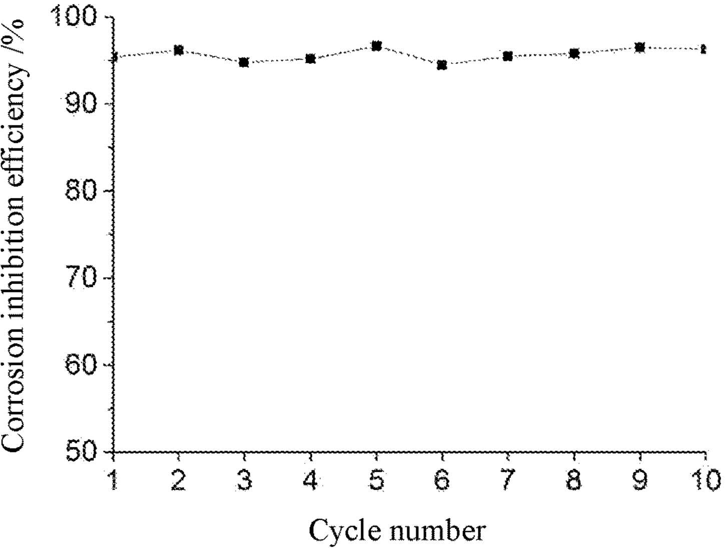
FIG. 6 is a graph illustrating the relation between the corrosion inhibition efficiency and the number of destabilization-regeneration cycles of the corrosion inhibitor aqueous formulation in Example 8 of the present disclosure.

The CT2-19 aqueous formulation produced in Example 1 was subjected to an accelerated aging test indoor to test the regenerability of the corrosion inhibitor aqueous formulation. The corrosion inhibitor aqueous formulation had destabilization phenomenon of separation occurred at 80° C. It was regenerated by heating up the destabilized aqueous formulation to 67° C., maintaining it at this temperature for 5 min, and then quickly cooling it. Such destabilization-regeneration was defined as a cycle, and the aqueous formulation was sampled after each cycle to evaluate the corrosion inhibitory performance. The evaluation was carried out under conditions same as those in Example 2, and the aqueous formulation was filled at a concentration of 1000 mg/L. The results are shown in FIG. 6, from which it can be seen that after 10 cycles, the corrosion inhibitory performance of the corrosion inhibitor is not significantly changed, indicating that the corrosion inhibitor aqueous formulation has a good regenerability.

It should be noted that the other components and operations for the aqueous formulation of the oil-soluble corrosion inhibitor and its preparation method provided in the present disclosure are known to a person of ordinary skill in the art, and each of the operations, steps, parameters and working principles not described can be acknowledged by a person of ordinary skill in the art without inventive work, and a person of skill in the art can refer to the relevant products and their preparation processes in the prior art, which will not be described in detail herein.

The foregoing are only specific embodiments of the present disclosure to enable those skilled in the art to understand or implement the invention. A variety of modifications to these embodiments will be apparent to those skilled in the art, and the general principles defined herein can be implemented in other embodiments without departing from the spirit or scope of the present disclosure. Thus, the invention will not be limited to these embodiments shown herein, but will cover the widest scope consistent with the principles and novel features claimed herein.

What is claimed is:

1. A method for preparing an aqueous formulation of an oil-soluble corrosion inhibitor, comprising the steps of:

(1) obtaining a temperature T at which the conductivity of the aqueous formulation of the oil-soluble corrosion inhibitor is decreased to no higher than 100 μs/cm;

(2) gradually adding water dropwise to a corrosion inhibitor stock solution, which is obtained by mixing the oil-soluble corrosion inhibitor and a solvent oil homogeneously, to produce a reverse micelle liquid A, and then heating up the reverse micelle liquid A to a temperature equal to or higher than the temperature T and maintaining at the temperature equal to or higher than the temperature T;

(3) mixing a non-ionic surfactant, an anionic surfactant and water homogeneously to obtain a mixture solution B, and heating up the mixture solution B to a temperature equal to or higher than the temperature T and maintaining at the temperature equal to or higher than the temperature T; and (4) mixing the reverse micelle liquid A and the mixture solution B homogeneously, and stirring it at the temperature equal to or higher than the temperature T for no more than 2 minutes before cooling it, to obtain the aqueous formulation of the oil-soluble corrosion inhibitor;

wherein in step (1), the temperature T is determined by a process comprising:

mixing homogeneously all raw materials for the formula components of the aqueous formulation of the oil-soluble corrosion inhibitor in advance to obtain a mixture C;

gradually heating up the mixture C, and detecting the trend of conductivity of the mixture C with the temperature during the heating process, wherein as the temperature increases, the conductivity increases and then decreases and continues to decrease to no higher than 100 μs/cm; and recording the temperature at which the conductivity is decreased to no higher than 100 μs/cm as the temperature T.

2. The method according to claim 1, wherein the raw materials for the aqueous formulation of the oil-soluble corrosion inhibitor include the following components by weight: 0.5-1.5 parts of the oil-soluble corrosion inhibitor, 2-10 parts of the solvent oil, 2-6 parts of the non-ionic surfactant, 0.01-0.2 parts of the anionic surfactant, and 5-20 parts of water.

3. The method according to claim 1, wherein the stirring is carried out in the operation of each of steps (1)-(4) at a rotating speed of 50-600 rpm.

4. The method according to claim 1, wherein in step (2), the oil-soluble corrosion inhibitor is 0.01-20% by weight of the corrosion inhibitor stock solution.

5. The method according to claim 1, wherein the oil-soluble corrosion inhibitor is selected from corrosion inhibitors dissolvable and dispersible in a hydrocarbon-based or ester-based solvent.

6. The method according to claim 1, wherein the solvent oil is selected from a polar or non-polar oil material.

7. The method according to claim 1, wherein the reverse micelle liquid A is prepared by a process including: gradually adding water dropwise to the corrosion inhibitor stock solution under stirring, and continuously stirring it for 24 hours to obtain the reverse micelle liquid A.

8. The method according to claim 7, wherein the water added dropwise is 0.01-2% by mass of the reverse micelle liquid A.

9. The method according to claim 1, wherein in step (3), the ratio of the total mass of the nonionic surfactant and the anionic surfactant to the mass of the reverse micelle liquid A is 1:(5-1).

10. The method according to claim 1, wherein in step (3), the mass ratio of the nonionic surfactant to the anionic surfactant is (1000-10):1.

11. The method according to claim 1, wherein the nonionic surfactant is one or both selected from a temperature-sensitive surfactant having a polyoxyethylene structure in the molecular structure and a temperature-sensitive surfactant having a polyol ester structure in the molecular structure.

12. The method according to claim 1, wherein in step (3), the anionic surfactant is selected from monovalent fatty acid salts having a carbon chain length of $C_{8-18}$.

13. The method according to claim 12, wherein the fatty acid salt is sodium oleate.

14. The method according to claim 1, wherein the mass percentage of water contained in the final aqueous formulation of the oil-soluble corrosion inhibitor is 30%-90%.

15. The method according to claim 1, wherein in step (4), the cooling is carried out in a rate of ≥10° C./min.

16. The method according to claim 1, further comprising the steps of:

when the aqueous formulation of the oil-soluble corrosion inhibitor appears to be destabilized, heating up the aqueous formulation of the oil-soluble corrosion inhibitor to the temperature T and maintaining for 1-10 minutes, and then cooling the aqueous formulation of the oil-soluble corrosion inhibitor to obtain a regenerated aqueous formulation of the oil-soluble corrosion inhibitor.

17. The method according to claim 16, wherein the cooling is carried out in a rate of ≥10° C./min.

18. The method according to claim 3, wherein the stirring is carried out in the operation of each of steps (1)-(4) at a rotating speed of 50-200 rpm.

19. The method according to claim 4, wherein in step (2), the oil-soluble corrosion inhibitor is 10% by weight of the corrosion inhibitor stock solution.

20. The method according to claim 6, wherein the solvent oil is one selected from a hydrocarbon-based mineral oil and an ester-based vegetable oil.

21. The method according to claim 14, wherein the mass percentage of water contained in the final aqueous formulation of the oil-soluble corrosion inhibitor is 40%-80%.

22. The method according to claim 21, wherein the mass percentage of water contained in the final aqueous formulation of the oil-soluble corrosion inhibitor is 50%-70%.

* * * * *